United States Patent
Karlinsky et al.

(10) Patent No.: US 11,816,593 B2
(45) Date of Patent: Nov. 14, 2023

(54) TAFSSL: TASK ADAPTIVE FEATURE SUB-SPACE LEARNING FOR FEW-SHOT LEARNING

(71) Applicant: International Business Machines Corporation, Armonk, NY (US)

(72) Inventors: Leonid Karlinsky, Mazkeret Batya (IL); Joseph Shtok, Binyamina (IL); Eliyahu Schwartz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 17/000,319

(22) Filed: Aug. 23, 2020

(65) Prior Publication Data

US 2022/0058505 A1 Feb. 24, 2022

(51) Int. Cl.
*G06N 20/00* (2019.01)
*G06N 7/01* (2023.01)
*G06F 16/55* (2019.01)
*G06V 10/762* (2022.01)
*G06V 10/764* (2022.01)
*G06V 10/774* (2022.01)

(52) U.S. Cl.
CPC .............. *G06N 7/01* (2023.01); *G06F 16/55* (2019.01); *G06N 20/00* (2019.01); *G06V 10/762* (2022.01); *G06V 10/764* (2022.01); *G06V 10/774* (2022.01)

(58) Field of Classification Search
CPC .......... G06N 7/01; G06N 20/00; G06F 16/55; G06V 10/762; G06V 10/764; G06V 10/774
See application file for complete search history.

(56) References Cited

U.S. PATENT DOCUMENTS

| | | | |
|---|---|---|---|
| 2008/0082468 A1* | 4/2008 | Long .................... | G06V 10/764 706/12 |
| 2016/0078359 A1* | 3/2016 | Csurka ................. | G06V 10/776 706/12 |

(Continued)

OTHER PUBLICATIONS

Li Fe-Fei, Fergus, Perona, A Bayesian Approach to Unsupervised One-Shot Learning of Object Categories, Proceedings Ninth IEEE International Conference on Computer Vision, Oct. 13, 2003, https://ieeexplore.ieee.org/document/1238476.

(Continued)

*Primary Examiner* — Md K Talukder
(74) *Attorney, Agent, or Firm* — Gregory J Kirsch

(57) ABSTRACT

Embodiments may include novel techniques for Task-Adaptive Feature Sub-Space Learning (TAFSSL). For example, in an embodiment, a method may be implemented in a computer system comprising a processor, memory accessible by the processor, and computer program instructions stored in the memory and executable by the processor, the method comprising: training a machine learning system to classify features in images by: generating a sample set comprising one or a few labeled training samples and one or a few additional samples containing instances of target classes, performing dimensionality reduction computed on the samples in the sample set to form a dimension reduced sub-space, generating class representatives in the dimension reduced sub-space using clustering, and classifying features in images using the trained machine learning system.

17 Claims, 6 Drawing Sheets

(56) References Cited

U.S. PATENT DOCUMENTS

2017/0091637 A1* 3/2017 Chae .................. G16B 40/20
2020/0130177 A1* 4/2020 Kolouri ................ G06N 3/045
2022/0058505 A1* 2/2022 Karlinsky ............ G06V 10/762

OTHER PUBLICATIONS

Mengye Ren, Eleni Triantafillou Sachin Ravi, Jake Snell, Kevin Swersky, Joshua B. Tenenbaum, Hugo Larochelle, Richard S. Zemel, Meta-Learning for Semi-Supervised Few-Shot Classification, ICLR 2018, Mar. 2018, https://www.researchgate.net/publication/323550056.

Christian Simon, Piotr Koniusz, Mehrtash Harandi, Projective Subspace Networks for Few-Shot Learning, ICLR 2019, ICLR 2019, Published Date: Sep. 28, https://openreview.net/forum?id=rkzfuiA9F7.

Moshe Lichtenstein, Prasanna Sattigeri, Rogerio Feris, Raja Giryes, Leonid Karlinsky, TAFSSL: Task-Adaptive Feature Sub-Space Learning for few-shot classification, ResearchGate, Mar. 2020, https://www.researchgate.net/publication/339972107.

Nan Lai, Meina Kan, Shiguang Shan, Xilin Chen, Task-adaptive Feature Reweighting for Few Shot Classification, Computer Vision—ACCV 2018, May 2019, https://www.researchgate.net/publication/333360181.

* cited by examiner

Fig. 4

| Bayesian K-Means (BKM) |
|---|
| Cluster the samples of task $\mathcal{T}$ ($Q \cup S$ or $U \cup S$ in transductive or semi-supervised FSL respectively) into $k$ clusters, associating each to $c_k$ - the centroid of cluster $k$.<br>for each $s \in S$, $q \in Q$, and $k$ do<br>$P(cluster(q) = k) = \frac{\exp(-\|q-c_k\|^2)}{\sum_j \exp(-\|q-c_j\|^2)}$<br>$P(cluster(s) = k) = \frac{\exp(-\|s-c_k\|^2)}{\sum_j \exp(-\|s-c_j\|^2)}$<br>$P(\mathcal{L}(q) = i \mid cluster(q) = k) = \sum_{\mathcal{L}(s)=i} \frac{\exp(-\|q-s\|^2) \cdot P(cluster(s)=k)}{\sum_{t \in S} \exp(-\|q-t\|^2) \cdot P(cluster(t)=k)}$<br>$P(\mathcal{L}(q) = i) = \sum_k P(\mathcal{L}(q) = i \mid cluster(q) = k) \cdot P(cluster(q) = k)$ |

Fig. 5

Mean-Shift Propagation (MSP)

Initialize:
Compute prototypes: $\{p_i = \frac{1}{k} \cdot \sum_{s \in S, \mathcal{L}(s)=i} s\}$, where $k$ is # of shots in task $\mathcal{T}$ for N times do

Compute $P(\mathcal{L}(x) = i) = \frac{\exp(-\|x-p_i\|^2)}{\sum_j \exp(-\|x-p_j\|^2)}$, $\forall x \in Q \cup S$ (or $x \in U \cup S$)

Compute predictions $c(x) = \operatorname{argmax}_i P(\mathcal{L}(x) = i)$ $K_i = \sum_x \mathbb{1}_{(c(x)=i) \wedge (P(\mathcal{L}(x)=i) > T)}$, where $T$ is a threshold parameter $K = \min_i \{K_i\}$ Compute the new prototypes: $\{p_i = \frac{1}{K} \cdot \sum_{x \in \hat{S}_i} x\}$, where $\hat{S}_i$ are the top $K$ samples that have $c(x) = i$ sorted in decreasing order of $P(\mathcal{L}(x) = i)$ return labels $c(q), \forall q \in Q$

TAFSSL: TASK ADAPTIVE FEATURE SUB-SPACE LEARNING FOR FEW-SHOT LEARNING

BACKGROUND

The present invention relates to for Task-Adaptive Feature Sub-Space Learning (TAFSSL).

The field of Few-Shot Learning (FSL) involves machine learning models learning from very few (typically 1 or 5) examples per novel class (classes that are unseen during training) has received a lot of attention and significant performance advances in the recent literature. While a number of techniques have been proposed for FSL, several factors have emerged as important for FSL performance, thus even the simplest of techniques may be state of the art. For example, techniques such as the backbone architecture used for FSL (bigger is better), the type of pre-training on the base classes used (meta-training vs regular, currently regular wins), the quantity and diversity of the base classes set (the more the better, as these things make the feature space richer and better adaptive to novel classes), and the usage of self-supervised tasks during pre-training (serving as a proxy for increasing the diversity and the number of base classes).

While these factors may practically eliminate the performance gaps between simple and more complex FSL methods, little to no attention has been given to another simple, yet very important factor for FSL performance—Task-Adaptive Feature Sub-Space Learning (TAFSSL), or a search for a compact sub-space that is most discriminative for a given few-shot task.

Accordingly, a need arises for improved techniques for Task-Adaptive Feature Sub-Space Learning (TAFSSL).

SUMMARY

Embodiments may include novel techniques for Task-Adaptive Feature Sub-Space Learning (TAFSSL). Such techniques may significantly boost the performance in FSL scenarios when some additional unlabeled data accompanies the novel few-shot task, whether it is the set of unlabeled queries (transductive FSL) or some additional set of unlabeled data samples for which predictions are not needed (semi-supervised FSL). Specifically, on the challenging few-shot benchmarks, embodiments of the present techniques may improve the current state-of-the-art in both transductive and semi-supervised FSL setting by, for example, more than 5%, while increasing the benefit of using unlabeled data in FSL to above 10% performance gain.

For example, in an embodiment, a method may be implemented in a computer system comprising a processor, memory accessible by the processor, and computer program instructions stored in the memory and executable by the processor, the method comprising: training a machine learning system to classify features in images by: generating a sample set comprising one or a few labeled training samples and one or a few additional samples containing instances of target classes, performing dimensionality reduction computed on the samples in the sample set to form a dimension reduced sub-space, generating class representatives in the dimension reduced sub-space using clustering, and classifying features in images using the trained machine learning system.

In embodiments, the generated sample set may comprise one or a few labeled training samples and one of one or a few bulk query samples that are used as unlabeled samples or one or a few unlabeled samples for which predictions are not needed and wherein the generated sample set is Gaussian, the dimensionality reduction may be performed by finding dimensions of maximal variance, and the clustering may be performed using Bayesian K-Means processing. The generated sample set may comprise one or a few labeled training samples and one of one or a few bulk query samples that are used as unlabeled samples or one or a few unlabeled samples for which predictions are not needed and wherein the generated sample set is non-Gaussian, the dimensionality reduction may be performed by finding dimensions that are maximally independent from each other and that best approximate the data, and the clustering may be performed using Bayesian K-Means processing. The generated sample set may comprise one or a few labeled training samples and one of one or a few bulk query samples that are used as unlabeled samples or one or a few unlabeled samples for which predictions are not needed and wherein the generated sample set is Gaussian, the dimensionality reduction may be performed by finding dimensions of maximal variance, and the clustering may be performed using Mean-Shift Propagation processing. The generated sample set may comprise one or a few labeled training samples and one of one or a few bulk query samples that are used as unlabeled samples or one or a few unlabeled samples for which predictions are not needed and wherein the generated sample set is non-Gaussian, the dimensionality reduction may be performed by finding dimensions that are maximally independent from each other and that best approximate the data, and the clustering may be performed using Mean-Shift Propagation processing. The method may further comprise performing end-to-end meta training of the neural network model using the generated class representatives. The generated sample set may comprise one or a few labeled training samples and one of one or a few bulk query samples that are used as unlabeled samples or one or a few unlabeled samples for which predictions are not needed and normalization of the bulk query samples and support samples and the query and unlabeled samples is performed separately.

In an embodiment, a system may comprise a processor, memory accessible by the processor, and computer program instructions stored in the memory and executable by the processor to perform: training a machine learning system to classify features in images by: generating a sample set comprising one or a few labeled training samples and one or a few additional samples containing instances of target classes, performing dimensionality reduction computed on the samples in the sample set to form a dimension reduced sub-space, generating class representatives in the dimension reduced sub-space using clustering, and classifying features in images using the trained machine learning system.

In an embodiment, a computer program product comprising a non-transitory computer readable storage having program instructions embodied therewith, the program instructions executable by a computer, to cause the computer to perform a method comprising: training a machine learning system to classify features in images by: generating a sample set comprising one or a few labeled training samples and one or a few additional samples containing instances of target classes, performing dimensionality reduction computed on the samples in the sample set to form a dimension reduced sub-space, generating class representatives in the dimension reduced sub-space using clustering, and classifying features in images using the trained machine learning system.

BRIEF DESCRIPTION OF THE DRAWINGS

The details of the present invention, both as to its structure and operation, can best be understood by referring to the accompanying drawings, in which like reference numbers and designations refer to like elements.

FIG. 4 illustrates an exemplary overview of BKM processing according to embodiments of the present techniques.

FIG. 5 illustrates an exemplary overview of MSP processing according to embodiments of the present techniques.

DETAILED DESCRIPTION

Figure 1:
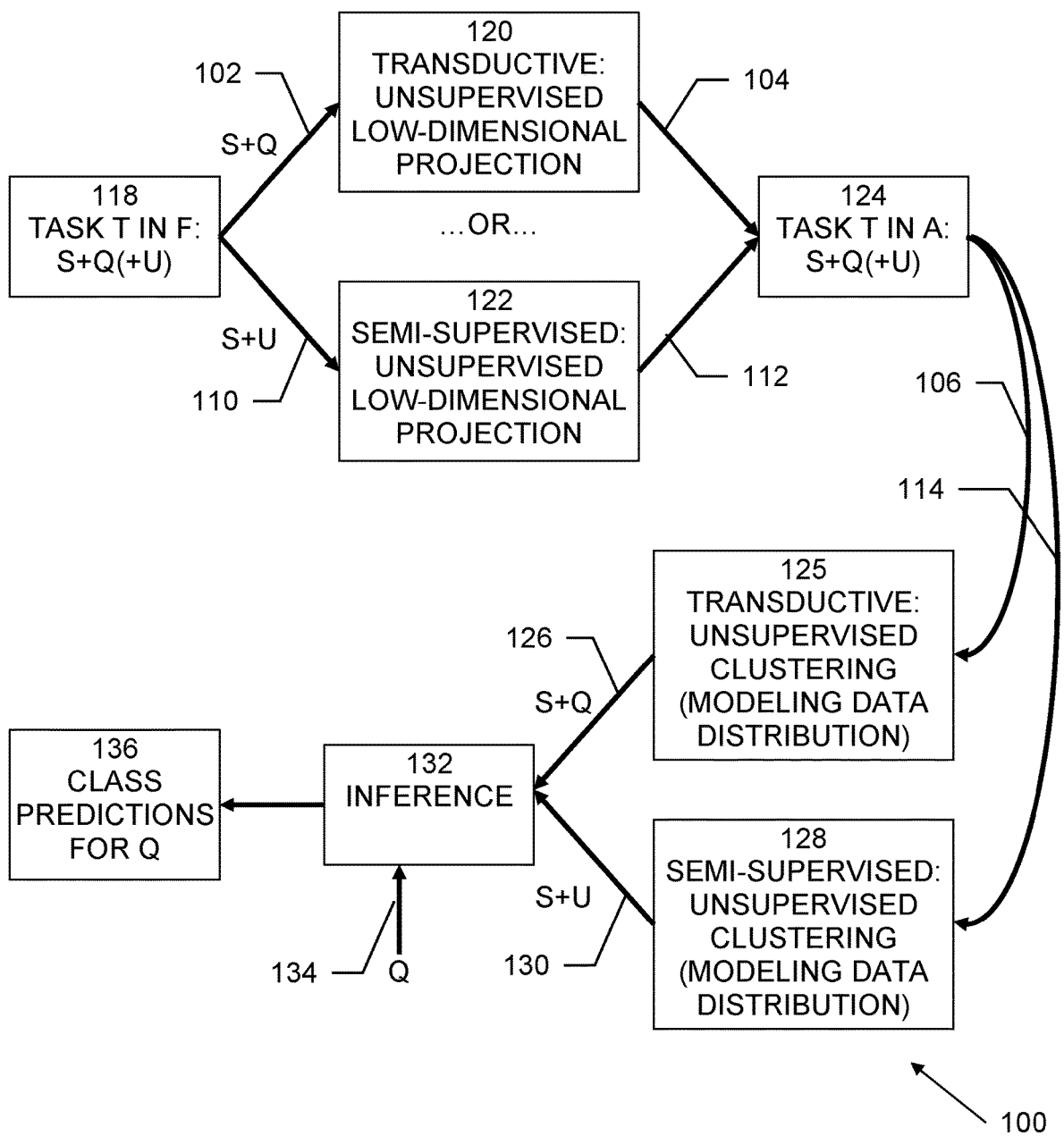
FIG. 1 illustrates an exemplary overview of TAFSSL processing according to embodiments of the present techniques.

Embodiments may include novel techniques for Task-Adaptive Feature Sub-Space Learning (TAFSSL). Such techniques may significantly boost the performance in FSL scenarios when some additional unlabeled data accompanies the novel few-shot task, whether it is the set of unlabeled queries (transductive FSL) or some additional set of unlabeled data samples for which predictions are not needed (semi-supervised FSL). In embodiments, the unlabeled data samples may contain unrelated samples, that is label noise, including images not belonging to any of the classes of interest. Specifically, on the challenging few-shot benchmarks, embodiments of the present techniques may improve the current state-of-the-art in both transductive and semi-supervised FSL setting by, for example, more than 5%, while increasing the benefit of using unlabeled data in FSL to above 10% performance gain.

In the task of few shot learning, or learning recognition models that can be adapted to new concepts (classes) using only few (for example, one) examples, little attention has been given to adaptation of the feature space at test time. Embodiments may focus on "filtering" the feature space and improving class representations using additional unlabeled data accompanying the few-shot task (with novel classes unseen during base training).

However, a slight adaptation of the backbone's feature space to a given task, using few iterations of fine-tuning on the support set or other techniques, may not be sufficient to bridge over the generalization gap introduced by the FSL backbone observing completely novel classes unseen during training (as demonstrated by relatively moderate performance gains obtained from these techniques). Intuitively, this may be attributed in part to many of the feature space dimensions (feature vector entries) becoming 'useless' for a given set of novel classes in the test few-shot task. Indeed, every feature vector entry may be seen as a certain 'pattern detector' which fires strongly when a certain visual pattern is observed on the input image. The SGD (or other) backbone training may make sure these patterns are discriminative for the classes used for pre-training. But for novel classes, many of these pattern detectors fail to find their patterns (which were in a sense 'over-fitted' to the base classes) and hence these entries mainly produce 'noise values'—some mode of the pattern detector distribution of activation which corresponds to 'pattern not observed'. Hence, we could conclude that that the 'signal-to-noise' of the FSL backbone feature space or the ratio of useful feature vector entries to ones which mainly output 'noise' significantly decreases when the backbone is presented with a novel classes few-shot task and it is unlikely that small modifications to the feature space can save the situation and recover a significant portion of the 'noise producing' feature entries. The high level of noise in the feature vectors intuitively has significant bad implications on the performance of the FSL classifier operating on this vector, especially the popular distance based classifiers such as nearest-neighbor [SimpleShot] and Prototypical Networks [PN] may be affected.

In light of this intuition, in order to obtain a significant performance boost, embodiments may concentrate on the so-called Task-Adaptive Feature Sub-Space Learning (TAFSSL)—seeking sub-spaces of the backbone's feature space that are discriminative for the novel classes of the test few-shot task and which are as noise free as possible, in which most of the sub-space dimensions indeed 'find' the patterns they represent in the images of the novel categories belonging to the task.

Embodiments or the present techniques may provide an approach for linear TAFSSL under transductive and semi-supervised FSL settings. In many practical applications of FSL, alongside the few labeled training examples (the support set) of the few shot task, additional unlabeled examples containing instances of the target novel classes are available. Such is the situation in transductive FSL which assumes that the query samples arrive in a 'bulk' and not one-by-one, and hence we can answer all the queries 'at once' while using the query set as unlabeled data. A similar situation exists in semi-supervised FSL, where an unlabeled set of images simply accompanies the few-shot task.

Figure 2:
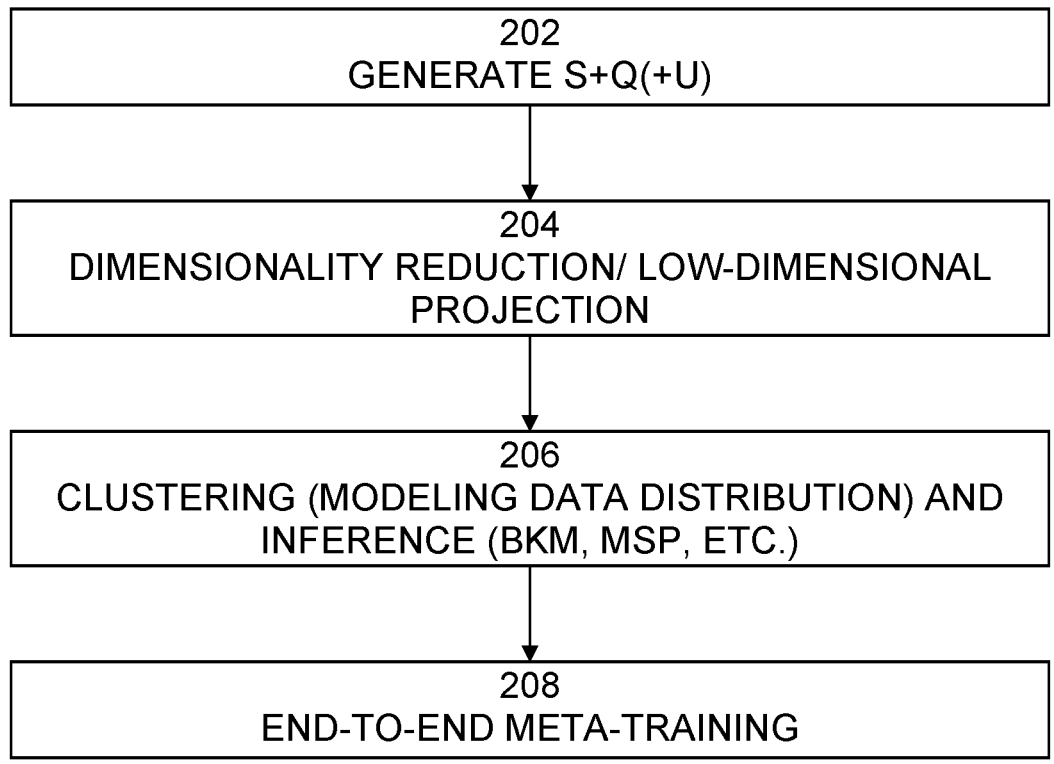
FIG. 2 is an exemplary flow diagram of TAFSSL processing according to embodiments of the present techniques.

An exemplary overview of TAFSSL processing 100 is shown in FIG. 1. It is best viewed in conjunction with FIG. 2, which a flow diagram of TAFSSL processing 200. TAFSSL processing 100 may include pathways for transductive FSL 102, 104, 106, 108 semi-supervised FSL 110, 112, 114, 116. In this example, T represents a few-shot task; S represents a support set; Q represents a query set; U represents an optional set of additional unlabeled examples (semi-supervised FSL); F represents an original feature space; A represents a task adapted feature sub-space.

Process 200 may begin with 202, in which, given a few-shot task T in an original feature space F, the process may generate a conjunction of a support set S and a query set Q (S+Q) 118 and may generate a conjunction of a support set S and/or an optional set of additional unlabeled examples U (S+U) 118. Embodiments may perform normalization of the query and support samples and the query and support samples may be normalized separately. At 204, dimensionality reduction/low-dimensional projection may be performed. S+Q 118 may be sent to transductive processing block 120, where unsupervised low-dimensional projection may be performed. Alternatively, or in addition, S+U 118 may be sent to semi-supervised processing block 122, where unsupervised low-dimensional projection may be performed. For example, a neural network (NN) module, such as may be included in transductive processing block 120 and/or semi-supervised processing block 122 may be attached implementing Principal Component Analysis (PCA) or Independent Component Analysis (ICA) dimensionality reduction computed on all the samples of the few-shot episode (task instance) extended with unlabeled data (optional, if semi-supervised). In embodiments, PCA/ICA may be applied to reduce the dimensions according to the number of "ways" (number of target classes) in the task.

The output(s) from processing blocks 120 and/or 122 may form a task adapted feature sub-space A 124. At 206, sub-space A 124 may be sent to transductive processing block 125, where unsupervised clustering (modeling data distribution) may be performed and clustered S+Q 126 may be generated and sent to inference processing block 132. Likewise, at 206, sub-space A 124 may be sent to semi-supervised processing block 128, where unsupervised clustering (modeling data distribution) may be performed and clustered S+U 130 may be generated and sent to inference processing block 132. Together, transductive processing block 125 and inference processing block 132 and/or semi-supervised processing block 128 and inference processing block 132 may apply one a clustering and inference technique to query set Q 134 produce class prediction representatives for query set Q 136 in a dimension-reduced (cleaned) sub-space. In embodiments, clustering and inference techniques such as Bayesian K-Means (BKM), Mean-Shift Propagation (MSP), etc., may be used and may provide soft-multiple association, and probabilistically grounded inference techniques.

At 208, end-to-end meta-training may be applied to co-optimize the backbone representation generator and the aforementioned components of the system to jointly work together to obtain improved performance. Embodiments using these techniques may improve transductive and semi-supervised FSL results by over 5%, and the benefit of using unlabeled data may increase the improvement to above 10% on multiple benchmarks. Once trained as desired, the system may be used for few-shot classification of sample data, such as images.

Figure 3:
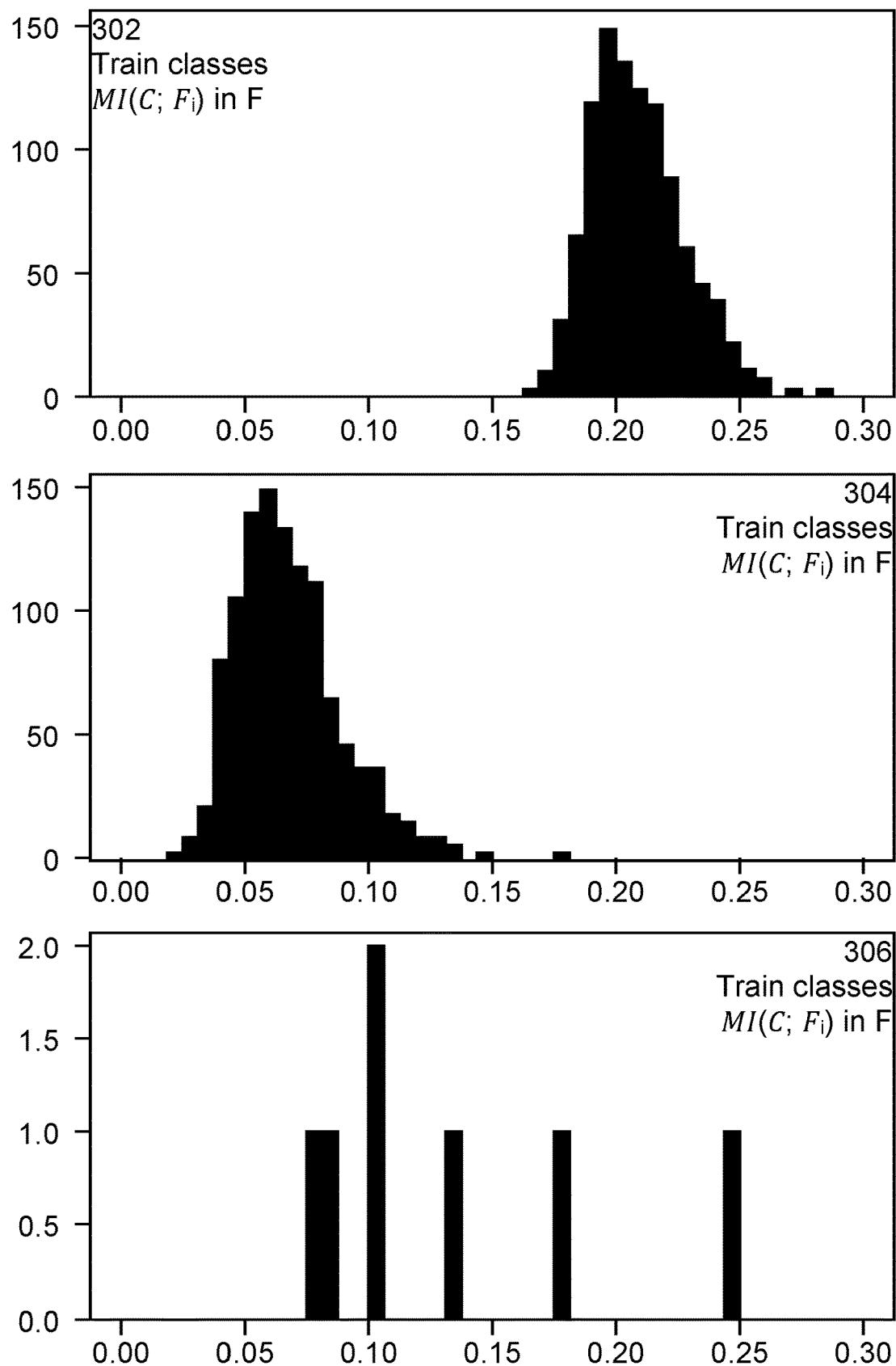
FIG. 3 illustrates examples of improved signal to noise ratio (SNR) in task adapted feature space according to embodiments of the present techniques.

Examples of improved signal to noise ratio (SNR) in task adapted feature space A that may be obtained using embodiments of the present techniques is shown in FIG. 3. In the examples shown in FIG. 3, the normalized (by minimum entropy) Mutual Information (MI) between either train or test classes and the features in F (of dimension 1024) or in A (7-dim) provides the motivation to use A over F, as is further described below.

The formal definition of TAFSSL may be derived as follows:

FSSL and TAFSSL: Let a CNN backbone $\mathcal{B}$ (for example, ResNet or DenseNet) pre-trained for FSL on a (large) dataset $\mathcal{D}$ with a set of base (training) classes $\mathcal{C}$. Here for simplicity, we equally refer to all different forms of proposed pre-training for FSL, whether meta-training or 'regular' training of a multi-class classifier for all the classes $\mathcal{C}$. Denote by $\mathcal{B}(x) \in \mathcal{F} \subset R^m$ to be a feature vector corresponding to an input image x represented in the feature space $\mathcal{F}$ by the backbone B. Under this notation, we define the goal of linear Feature Sub-Space Learning (FSSL) to find an 'optimal' (for a certain task) linear sub-space $\mathcal{A}$ of $\mathcal{F}$ and a linear mapping W of size r×m (typically with r≪m) such that:

$$R^r \supset \mathcal{A} \ni A = W \cdot \mathcal{B}(x) \qquad (1)$$

is the new representation of an input image x as a vector A in the feature sub-space $\mathcal{A}$ (spanned by rows of W).

Now, consider an n-way+k-shot few-shot test task $\mathcal{T}$ with a query set Q, and a support set:

$$S = \{s_i^j | 1 \le i \le n, 1 \le j \le k, \mathcal{L}(s_i^j) = i\},$$

where $\mathcal{L}(x)$ is the class label of image x, so in S we have k training samples (shots) for each of the n classes in the task $\mathcal{T}$. Using the PN paradigm we assume k=1 (otherwise support examples of the same class are averaged to a single class prototype) and that each q∈Q is classified using Nearest Neighbor (NN) in $\mathcal{T}$:

$$CLS(q) = \operatorname*{argmin}_{i} \|\mathcal{B}(s_i^1) - \mathcal{B}(q)\|^2 \qquad (2)$$

Then, in the context of this given task $\mathcal{T}$, we can define linear Task-Adaptive FSSL (TAFSSL) as a search for a linear sub-space $\mathcal{A}$ $\mathcal{T}$ of the feature space $\mathcal{F}$ defined by a $\mathcal{T}$-specific projection matrix $\mathcal{W}$, such that the probability:

$$\frac{\exp(-\mathcal{T} \cdot \|W_\mathcal{T} \cdot (\mathcal{B}(s_{\mathcal{L}(q)}^{1,i})) - \mathcal{B}(q)\|^2)}{\sum_i \exp(-\mathcal{T} \cdot \|W_\mathcal{T} \cdot (\mathcal{B}(s_i^1)) - \mathcal{B}(q)\|^2)} \qquad (3)$$

of predicting q to belong to the same class as the 'correct' support $$s_{\mathcal{L}(q)}^1$$

is maximized, while of course the true label L(q) is unknown at test time (here $\mathcal{T}$ in eq. 3 is a temperature parameter, we used τ=1).

Discussion Using the 'pattern detectors' intuition described above, consider the activations of each dimension $F_d$ of F∈ $\mathcal{F}$ as a random variable with a Mixture of (two) Gaussians (MoG) distribution:

$$F_d \sim P_d = \rho_n \cdot N(\mu_n, \sigma_n) + \rho_s \cdot N(\mu_s, \sigma_s) \qquad (4)$$

where ($\mu_n$, $\sigma_n$) and ($\mu_s$, $\sigma_s$) are the expectation and variance of the $F_d$'s distribution of activations when $F_d$ does not detect (noise) or detects (signal) the pattern respectively. The $\rho_n$ and $\rho_s$ are the noise and the signal prior probabilities respectively $$(\rho_n + \rho_s = 1).$$

For brevity, we drop the index d from the distribution parameters. Naturally, for the training classes $C_b$, for most dimensions $F_d$ the $\rho_s \gg 0$ implying that the dimension is 'useful' and does not produce only noise (FIG. 3, 302). However, for the new (unseen during training) classes of a test task $\mathcal{T}$ this is no longer the case, and it is likely that for the majority of dimensions $\rho_s^T T \approx 0$ (FIG. 3, 304). Assuming (for the time being) that $F_d$ are conditionally independent, the square Euclidean distance could be seen as an aggregation of votes for the 'still useful' (for the classes of $\mathcal{T}$) patterns, and a sum of squares of i.i.d (zero mean) Gaussian samples for the patterns that are 'noise only' on the classes of $\mathcal{T}$. The latter 'noise dimensions' randomly increase the distance on the expected order of $N^{\mathcal{T},\mathcal{F}} \cdot \sigma_n^2$, where $N^{\mathcal{T},\mathcal{F}}$ is the number of noise features of the feature space $\mathcal{F}$ or the classes of task $\mathcal{T}$. Using this intuition, if we could find such a TAFSSL sub-space $\mathcal{A}_\mathcal{T}$ adapted to the task $\mathcal{T}$ so that $N^{\mathcal{T},\mathcal{S}_\mathcal{T}}$ is reduced (FIG. 3, 304), we would improve the performance of the NN classifier on $\mathcal{T}$. With only few labeled samples in the support set S, we cannot expect to effectively learn the $\mathcal{W}_\mathcal{T}$ projection to the sub-space $\mathcal{A}_\mathcal{T}$ using SGD on S. Yet, when unlabeled data accompanies the task $\mathcal{T}$(Q in transductive FSL, or an additional set of unlabeled samples U in semi-supervised FSL), we can use this data to find such $\mathcal{W}_\mathcal{T}$ that: (a) the dimensions of $\mathcal{A}_\mathcal{T}$ are 'disentangled', meaning their pairwise independence is maximized; (b) after the 'disentanglement' we choose the dimensions that are expected to 'exhibit the least noise' or in our previous MoG notation have the largest $\rho_s$ values.

Luckily, simple classical methods can be used for TAFSSL approximating the requirements (a) and (b). Both Principle Component Analysis (PCA) and Independent Component Analysis (ICA) applied in $\mathcal{F}$ on the set of samples: S∪Q (transductive FSL) or S∪U (semi-supervised FSL) can approximate (a). PCA under the approximate joint Gaussianity assumption of $\mathcal{F}$, and ICA under approximate non-Gaussianity assumption. In addition, if after the PCA rotation we subtract the mean, the variance of the (zero-mean) MoG mixtures for the transformed (independent) dimensions would be:

$$\rho_n \cdot (\mu_n^2 + \sigma_n^2) + \rho_s \cdot (\mu_n^2 + \sigma_n^2) \quad (4)$$

Then assuming $\mu_n$ and $\sigma_n$ are roughly the same for all dimensions (which is reasonable due to heavy use of Batch Normalization (BN) in the modern backbones), choosing the dimensions with higher variance in PCA would lead to larger $\rho_s$, $\mu_s$, and $\sigma_s$—all of which are likely to increase the signal-to-noise ratio of the NN classifier. Larger $\mu_s$ leads to patterns with stronger 'votes', larger $\sigma_s$ means wider range of values that may better discriminate multiple classes, and larger $\rho_s$ means patterns that are more frequent for classes of $\mathcal{T}$. Similarly, the dimensions with bigger $\rho_s$ exhibit stronger departure from Gaussianity and hence would be chosen by ICA. Embodiments may perform normalization of the query and support samples separately.

TAFSSL summary. To summarize, both PCA and ICA may be used as simple approximations for TAFSSL using unlabeled data and therefore may be used to perform the 'unsupervised low-dimensional projection' 120, 122 of FIG. 1. PCA and ICA on their own (when directly followed by an NN classifier) may lead to significant FSL performance boosts.

Clustering. Clustering may be a useful tool for transductive and semi-supervised FSL assuming that modes of the task $\mathcal{T}$ data distribution (including both labeled and unlabeled image samples) correspond classes. However, in the presence of feature 'noise' in $\mathcal{F}$, the 'class' modes may become mixed with the noise distribution modes, which may blur the class modes boundaries or swallow the class modes altogether.

In contrast, after applying PCA or ICA based TAFSSL, the feature noise levels may be significantly reduced (FIG. 3), making the task-adapted feature sub-space $\mathcal{A}_\mathcal{T}$ of the original feature space $\mathcal{F}$ more effective for clustering. Embodiments may utilize, for example, either of two clustering-based algorithms, the Bayesian K-Means (BKM) and Mean-Shift Propagation (MSP). Following PCA or ICA based TAFSSL, these clustering techniques may add, for example, about 5% to the performance. These techniques may be used to perform the 'unsupervised clustering' 125, 128+inference' 132 processing (FIG. 1).

The BKM is a soft k-means variant accompanied with Bayesian inference for computing class probabilities for the queries. In BKM, each k-means cluster, obtained for the entire set of (labeled+unlabeled) task $\mathcal{T}$ data, is treated as a Gaussian mixture distribution with a mode for each class. The BKM directly computes the class probability for each query q∈Q by averaging the posterior of q in each of the mixtures with weights corresponding to q's association probability to each cluster. The details of BKM are shown in FIG. 4.

The MSP is a mean-shift based approach, that is used to update the prototype of each class. In MSP we perform a number of mean-shift like iterations on the prototypes of the classes taken within the distribution of all the (labeled and unlabeled) samples of $\mathcal{T}$. In each iteration, for each prototype pi (of class i), we compute a set of K most confident samples within a certain confidence radius and use the mean of this set as the next prototype (of class i). The K itself is balanced among the classes. The details of MSP are shown in FIG. 5. Following MSP, the updated prototypes are used in standard NN classifier fashion to obtain the class probabilities.

Implementation details. Embodiments of TAFSSL approaches may be implemented in, for example, PyTorch. For example, the PyTorch native version of SVD may be used for PCA, and FastICA from sklearn may be used for ICA. The k-means from sklearn may be used for BKM. Examples of sub-space dimensions were 4 for PCA based TAFSSL, and 10 for ICA based TAFSSL. The T=0.3 and N=4 were used for MSP, and k=5 for BKM, all set using validation. Embodiments may use the backbone implementations from, for example, SimpleShot. Embodiments may, for example, use the DenseNet backbone Using the most time consuming of the proposed TAFSSL approaches (ICA+BKM) running time was, for example, measured as below 0.05 seconds (CPU) for a typical 1-shot and 5-way episode with 15 queries per class.

Figure 6:
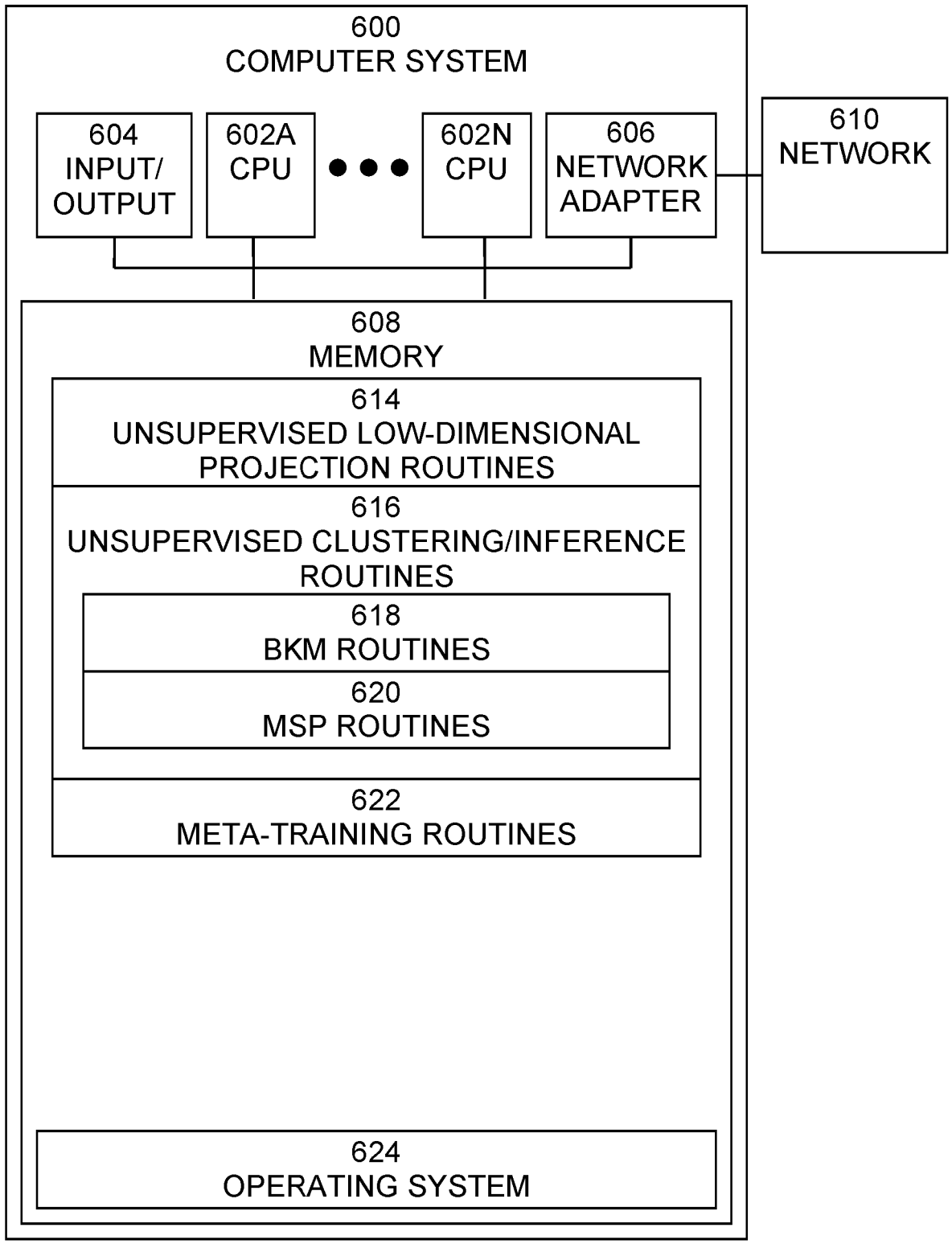
FIG. 6 is an exemplary block diagram of a computer system, in which processes involved in the embodiments described herein may be implemented.

An exemplary block diagram of a computer system 600, in which processes involved in the embodiments described herein may be implemented, is shown in FIG. 6. Computer system 600 may be implemented using one or more programmed general-purpose computer systems, such as embedded processors, systems on a chip, personal computers, workstations, server systems, and minicomputers or mainframe computers, or in distributed, networked computing environments. Computer system 600 may include one or more processors (CPUs) 602A-602N, input/output circuitry 604, network adapter 606, and memory 608. CPUs 602A-602N execute program instructions in order to carry out the functions of the present communications systems and methods. Typically, CPUs 602A-602N are one or more microprocessors, such as an INTEL CORE® processor. FIG. 6 illustrates an embodiment in which computer system 600 is implemented as a single multi-processor computer system, in which multiple processors 602A-602N share system resources, such as memory 608, input/output circuitry 604, and network adapter 606. However, the present communications systems and methods also include embodiments in which computer system 600 is implemented as a plurality of networked computer systems, which may be single-processor computer systems, multi-processor computer systems, or a mix thereof.

Input/output circuitry 604 provides the capability to input data to, or output data from, computer system 600. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 606 interfaces device 600 with a network 610. Network 610 may be any public or proprietary LAN or WAN, including, but not limited to the Internet.

Memory 608 stores program instructions that are executed by, and data that are used and processed by, CPU 602 to perform the functions of computer system 600. Memory 608 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 608 may vary depending upon the function that computer system 600 is programmed to perform. In the example shown in FIG. 6, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 6, memory 608 may include unsupervised low-dimensional projection routines 614, unsupervised clustering/inference routines 616, which may include BKM routines 618 and MSP routines 620, meta-training routines 622, and operating system 630. Unsupervised low-dimensional projection routines 612 may include software routines to implement PCA or ICA based TAFSSL, as described above. Unsupervised clustering/inference routines 614 may include software routines to perform Bayesian K-Means (BKM) 620 and Mean-Shift Propagation (MSP) 622, as described above. Meta-training routines 622 may include software routines to perform end-to-end meta-training, as described above. Operating system 630 may provide overall system functionality.

As shown in FIG. 6, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, implemented in a computer system comprising a processor, memory accessible by the processor, and computer program instructions stored in the memory and executable by the processor, the method comprising:
   training a machine learning system to classify features in images by:
      generating a sample set comprising one or a few labeled training samples and one or a few bulk query samples that are used as unlabeled samples or one or a few unlabeled samples for which predictions are not needed, and wherein the generated sample set is Gaussian,
      performing dimensionality reduction computed on the samples in the sample set to form a dimension reduced sub-space, wherein the dimensionality reduction is performed by finding dimensions of maximal variance,
      generating class representatives in the dimension reduced sub-space using clustering, wherein the clustering is performed using Mean-Shift Propagation processing; and
   classifying features in images using the trained machine learning system.

2. The method of claim 1, further comprising performing end-to-end meta training of the neural network model using the generated class representatives.

3. The method of claim 1, wherein the generated sample set comprises one or a few labeled training samples and one of one or a few bulk query samples that are used as unlabeled samples or one or a few unlabeled samples for which predictions are not needed and normalization of the bulk query samples and support samples and the query and unlabeled samples is performed separately.

4. A method, implemented in a computer system comprising a processor, memory accessible by the processor, and computer program instructions stored in the memory and executable by the processor, the method comprising:
   training a machine learning system to classify features in images by:
      generating a sample set comprising one or a few labeled training samples and one or a few bulk query samples that are used as unlabeled samples or one or a few unlabeled samples for which predictions are not needed and wherein the generated sample set is non-Gaussian;
performing dimensionality reduction on the samples in the sample set to form a dimension reduced sub-space by finding dimensions that are maximally independent from each other and that best approximate the data,
generating class representatives in the dimension reduced sub-space using clustering performed using Mean-Shift Propagation processing; and
classifying features in images using the trained machine learning system.

5. The method of claim 4, further comprising performing end-to-end meta training of the neural network model using the generated class representatives.

6. The method of claim 4, wherein the generated sample set comprises one or a few labeled training samples and one or a few bulk query samples that are used as unlabeled samples or one or a few unlabeled samples for which predictions are not needed and normalization of the bulk query samples and support samples and the query and unlabeled samples is performed separately.

7. A system comprising a processor, memory accessible by the processor, and computer program instructions stored in the memory and executable by the processor to perform:
training a machine learning system to classify features in images by:
generating a sample set comprising one or a few labeled training samples and one or a few bulk query samples that are used as unlabeled samples or one or a few unlabeled samples for which predictions are not needed and wherein the generated sample set is Gaussian,
performing dimensionality reduction computed on the samples in the sample set to form a dimension reduced sub-space, wherein the dimensionality reduction is performed by finding dimensions of maximal variance,
generating class representatives in the dimension reduced sub-space using combined clustering and inference performed using Mean-Shift Propagation processing; and
classifying features in images using the trained machine learning system.

8. The method of claim 7, further comprising performing end-to-end meta training of the neural network model using the generated class representatives.

9. The method of claim 7, wherein the generated sample set comprises one or a few labeled training samples and one or a few bulk query samples that are used as unlabeled samples or one or a few unlabeled samples for which predictions are not needed and normalization of the bulk query samples and support samples and the query and unlabeled samples is performed separately.

10. A system comprising a processor,
memory accessible by the processor, and computer program instructions stored in the memory and executable by the processor to perform:
training a machine learning system to classify features in images by:
generating a sample set comprising one or a few labeled training samples and one or a few bulk query samples that are used as unlabeled samples or one or a few unlabeled samples for which predictions are not needed and wherein the generated sample set is non-Gaussian;
performing dimensionality reduction on the samples in the sample set to form a dimension reduced sub-space by finding dimensions that are maximally independent from each other and that best approximate the data using a neural network model implementing Independent Component Analysis dimensionality reduction,
generating class representatives in the dimension reduced sub-space using combined clustering and inference performed using Mean-Shift Propagation processing; and
classifying features in images using the trained machine learning system.

11. The system of claim 10, further comprising performing end-to-end meta training of the neural network model using the generated class representatives.

12. The system of claim 10, wherein the generated sample set comprises one or a few labeled training samples and one or a few bulk query samples that are used as unlabeled samples or one or a few unlabeled samples for which predictions are not needed and normalization of the bulk query samples and support samples and the query and unlabeled samples is performed separately.

13. A computer program product comprising a non-transitory computer readable storage having program instructions embodied therewith, the program instructions executable by a computer, to cause the computer to perform a method comprising:
training a machine learning system to classify features in images by:
generating a sample set comprising one or a few labeled training samples and one or a few bulk query samples that are used as unlabeled samples or one or a few unlabeled samples for which predictions are not needed and wherein the generated sample set is Gaussian,
performing dimensionality reduction computed on the samples in the sample set to form a dimension reduced sub-space, wherein the dimensionality reduction is performed by finding dimensions of maximal variance,
generating class representatives in the dimension reduced sub-space using combined clustering and inference performed using Mean-Shift Propagation processing; and
classifying features in images using the trained machine learning system.

14. The computer program product of claim 13, further comprising performing end-to-end meta training of the neural network model using the generated class representatives and the generated sample set comprises one or a few labeled training samples and one or a few bulk query samples that are used as unlabeled samples or one or a few unlabeled samples for which predictions are not needed and normalization of the bulk query samples and support samples and the query and unlabeled samples is performed separately.

15. A computer program product comprising a non-transitory computer readable storage having program instructions embodied therewith, the program instructions executable by a computer, to cause the computer to perform a method comprising:
training a machine learning system to classify features in images by:
generating a sample set comprising one or a few labeled training samples and one or a few bulk query samples that are used as unlabeled samples or one or a few unlabeled samples for which predictions are not needed and wherein the generated sample set is non-Gaussian;

performing dimensionality reduction on the samples in the sample set to form a dimension reduced sub-space by finding dimensions that are maximally independent from each other and that best approximate the data, generating class representatives in the dimension reduced sub-space using combined clustering and inference performed using Mean-Shift Propagation processing; and classifying features in images using the trained machine learning system.

16. The computer program product of claim 15, further comprising performing end-to-end meta training of the neural network model using the generated class representatives.

17. The computer program product of claim 15, wherein the generated sample set comprises one or a few labeled training samples and one or a few bulk query samples that are used as unlabeled samples or one or a few unlabeled samples for which predictions are not needed and normalization of the bulk query samples and support samples and the query and unlabeled samples is performed separately.

* * * * *